(12) United States Patent
Clarke (10) Patent No.: US 11,541,994 B2
(45) Date of Patent: Jan. 3, 2023

(54) NEGATIVE HINGE OFFSET ROTOR HEAD FOR A HELICOPTER

(71) Applicant: FT HOLDINGS INC., Calgary (CA)

(72) Inventor: Daniel John Clarke, Calgary (CA)

(73) Assignee: FT HOLDINGS INC., Calgary (CA)

( * ) Notice: Subject to any disclaimer, the term of this patent is extended or adjusted under 35 U.S.C. 154(b) by 149 days.

(21) Appl. No.: 16/842,107

(22) Filed: Apr. 7, 2020

(65) Prior Publication Data

US 2020/0324887 A1 Oct. 15, 2020

Related U.S. Application Data

(60) Provisional application No. 62/831,247, filed on Apr. 9, 2019.

(51) Int. Cl.
*B64C 27/32* (2006.01)
*B64C 27/48* (2006.01)
*B64C 27/14* (2006.01)
*B64C 27/10* (2006.01)

(52) U.S. Cl.
CPC .............. *B64C 27/32* (2013.01); *B64C 27/10* (2013.01); *B64C 27/14* (2013.01); *B64C 27/48* (2013.01)

(58) Field of Classification Search
CPC ......... B64C 27/10; B64C 27/14; B64C 27/32; B64C 27/37; B64C 27/39; B64C 27/41; B64C 27/48
USPC ................. 416/117, 124, 140, 141
See application file for complete search history.

(56) References Cited

U.S. PATENT DOCUMENTS

| | | | | |
|---|---|---|---|---|
| 2,133,043 | A * | 10/1938 | Rothenhoefer | B64C 27/615 |
| | | | | 416/112 |
| 2,589,527 | A * | 3/1952 | Bennett | B64C 27/39 |
| | | | | 244/17.11 |
| 2,686,570 | A * | 8/1954 | Haig, Jr. | B64C 27/37 |
| | | | | 416/141 |
| 7,273,195 | B1 | 9/2007 | Golliher | |
| 9,902,493 | B2 | 2/2018 | Simon et al. | |
| 2007/0215750 | A1 | 9/2007 | Shantz et al. | |
| 2009/0220341 | A1 | 9/2009 | Schmaling | |
| 2013/0206915 | A1 | 8/2013 | Desaulniers | |

FOREIGN PATENT DOCUMENTS

| | | |
|---|---|---|
| CN | 103552686 A | 2/2014 |
| CN | 203666982 U | 6/2014 |
| CN | 204822069 U | 12/2015 |
| CN | 105366043 A | 3/2016 |
| WO | 89/07547 A1 | 8/1989 |

(Continued)

OTHER PUBLICATIONS

International Search Report Corresponding to PCT/CA2017/051458 dated Mar. 2, 2018.

(Continued)

*Primary Examiner* — Woody A Lee, Jr.
*Assistant Examiner* — Justin A Pruitt
(74) *Attorney, Agent, or Firm* — Finch & Maloney PLLC (57) ABSTRACT

A negative hinge offset rotor head for a coaxial helicopter, the rotor head having two or more flapping rotor blades having outer and inner tips, the inner tips rotatably attached to a hinge attachment rotated by a driveshaft where the driveshaft is positioned between the rotor blades and the rotor blades' respective hinge attachment.

16 Claims, 8 Drawing Sheets

(56) References Cited

FOREIGN PATENT DOCUMENTS

WO      2013/060693 A2     5/2013
WO      2016/132040 A1     8/2016

OTHER PUBLICATIONS

Written Opinion Corresponding to PCT/CA2017/051458 dated Mar. 2, 2018.
Supplementary European Search Report issued in corresponding European Patent Application No. 17877729.8 dated Jul. 7, 2020.
Canadian Office Action Corresponding to 3,077,774 dated May 12, 2021.

* cited by examiner

NEGATIVE HINGE OFFSET ROTOR HEAD FOR A HELICOPTER

CROSS-REFERENCE TO RELATED APPLICATIONS

This application claims priority of U.S. provisional patent application Ser. No. 62/831,247 filed 9 Apr. 2019, which is incorporated by reference into this application in its entirety.

TECHNICAL FIELD

The present disclosure is related to the field of drive systems for aerial vehicles, in particular, coaxial helicopters equipped with pitch roll control motors and propellers.

BACKGROUND

Figure 1:
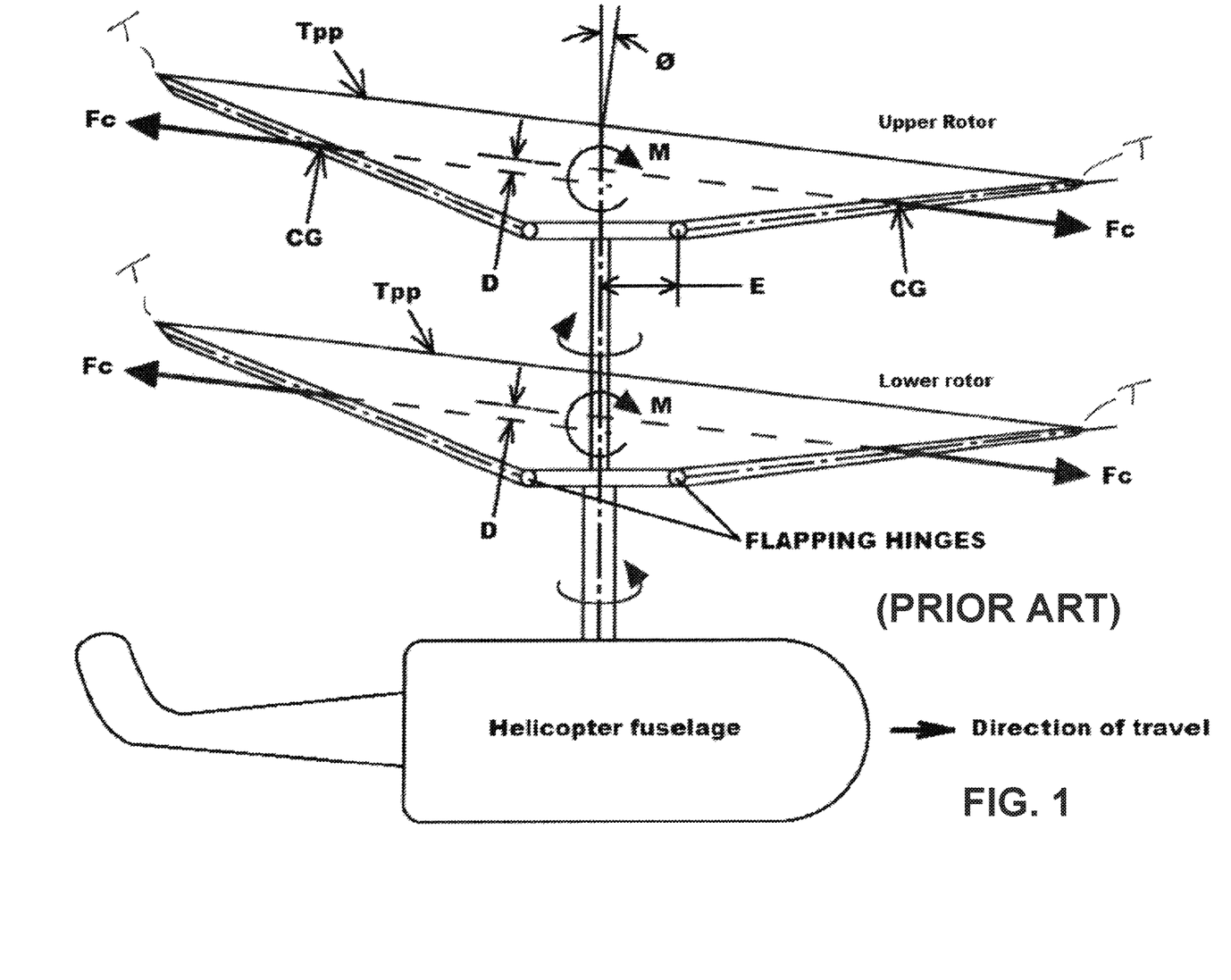
FIG. 1 is a side elevation view depicting the flapping rotor hinge arrangement of a prior art coaxial helicopter.

It is known to those skilled in the art that conventional helicopters of all types can benefit from the use of flapping hinges. Flapping hinges allow the rotor blades to flap up and down as the rotor disk rotates, eliminating the bending stresses in the blade that would otherwise occur if no hinge was fitted. An example of the placement of the flapping hinges on a conventional prior art coaxial helicopter with 2 blades per rotor is shown in FIG. 1.

In this example, the hinges are fitted close to the axis of rotation of the rotor but are offset away from the axis of rotation of the driveshaft in the direction of the rotor blade a distance denoted by dimension E. The flapping hinge offset provides the same benefits to helicopters with more than two blades per rotor, but for simplicity only helicopters with two blades per rotor will be discussed here.

The flapping hinge offset is almost always positive, that is, in the direction of the rotor blade, because this results in an improvement in pitch and roll control as described herein. The only exception is in the case of a teetering rotor system, wherein the flapping hinge axis intersects the driveshaft axis. In this case, distance E would be zero. This layout does not provide the benefits that a positive value of E provides.

It is known to those skilled in the art that a conventional helicopter with flapping hinges, coaxial or otherwise, derives its pitch and roll control by using cyclic pitch control to tilt the rotor disk in the direction of desired movement. In the example shown in FIG. 1, the rotor disks have been tilted forward an angle of θ. This creates a nose-down pitching moment from two effects. The first effect is the offset of the thrust vector of the rotor disks to behind the center of gravity of the aircraft, which in this case results in a pitching moment that acts to pitch the aircraft nose-down. This effect is well known to those skilled in the art.

In the example shown in FIG. 1, additional forward pitching moment is obtained from the positive hinge offset distance E. As the rotor disk tilts forward in this case, the Tip Path Plane (plane about which the rotor blade tips, T, travel as the revolve, denoted as TPP in this example) also tilts forward by an angle that is approximately the same as the disk tilt angle θ. Shown in the diagram are the centripetal force vectors of the rotor blades, denoted by forces Fc in this example. It is known to those skilled in the art that centripetal force vectors act through the center of gravity of the rotor blades, denoted by CG in this example. The act largely radially outwards of the rotor disk, and parallel to tip path plane TPP as shown. Due to the flapping hinge offset E, the CG of the rear rotor blade is further away from the TPP than the CG of the front rotor blade as shown. Due to this, the centripetal force vectors from the front and rear rotor blades do not intersect, but are offset from each other by a distance denoted by D, resulting in a nose-down pitching moment from each rotor disk denoted by M. For helicopters having two rotor blades fitted per rotor, this pitching moment is not constant, rather, it can vary sinusoidally with rotation of the rotor disk. The pitching moment can be at a maximum when the rotor blades are positioned as shown in the example and can be at a minimum when the rotor blades are rotated 90 degrees from that shown. For helicopters having 3 or more rotor blades per rotor, the pitching moment can be constant.

It is known to those skilled in the art the pitching moments M that results from the flapping hinge offset E shown in FIG. 1 assists the pitching moment that results from the offset thrust vector from disk tilt described previously. This is known to improve pitch and roll response, which is highly desirable from a control perspective, however, it also results in limiting the top speed that the conventional helicopter can achieve. In a conventional helicopter with cyclic pitch and flapping hinges, the flapping hinges are not necessarily the limiting factor of top speed, however this can be the case where the hinge offset is relatively large It is, therefore, desirable to provide a system and method that counters the aforementioned pitching moment and, thereby, increases the top speed a helicopter can travel at.

SUMMARY

A system and method for improving the top speed of a coaxial helicopter, namely, a negative hinge offset rotor head for a helicopter is provided.

In some embodiments, the system can comprise a hinge attachment operatively coupled to a driveshaft extending from the helicopter. The hinge attachment can comprise at least two hinge yokes for hingeably attaching to at least two rotor blades. The hinge attachment can be configured to allow each rotor blades to rotate or "flap" about a hinge axis that can be substantially orthogonal to the longitudinal axis of the driveshaft. In some embodiments, the hinge attachment can be configured such that the driveshaft be disposed between the hinge axis and an outer tip of each rotor blade.

Applicant's international patent application no. PCT/CA2017/051458 filed 4 Dec. 2017 for "Large Payload Unmanned Aerial Vehicle" is directed to the technology of unmanned aerial vehicles used for carrying large payloads and is incorporated by reference into this application in its entirety.

Broadly stated, in some embodiments, a rotor system for a coaxial helicopter can be provided, comprising: at least two rotor blades, each of the at least two rotor blades comprising an outer tip and an inner tip; a hinge attachment operatively coupled to a driveshaft configured to rotate about a longitudinal driveshaft axis, the hinge attachment comprising a hinge yoke for each of the at least two rotor blades, the hinge yokes rotatably attached to the inner tips of the at least two rotor blades whereby each of the at least two rotor blades rotate about a hinge axis substantially orthogonal to the driveshaft axis; and the hinge attachment configured such that the driveshaft axis is disposed between each of the at least two rotor blades and the hinge axis thereof.

Broadly stated, in some embodiments, a drive system for coaxial helicopter can be provided, comprising: a driveshaft extending from a motor disposed in the helicopter, the concentric driveshaft comprising an upper rotor driveshaft and a lower rotor driveshaft concentrically disposed about the upper rotor driveshaft, the driveshaft comprising a longitudinal driveshaft axis, the lower and upper rotor driveshafts configured to rotate in opposite directions to each other; a plurality of control motors and propellers dispose at an upper end of the driveshaft, the plurality of control motors and propellers configured to provide pitch and roll control of the helicopter; an upper rotor operatively coupled to the upper rotor driveshaft; a lower rotor operatively coupled to the lower rotor driveshaft; each of the upper and lower rotors comprising at least two rotor blades, each of the at least two rotor blades comprising an outer tip and an inner tip; a hinge attachment operatively coupled to each of the upper and lower rotor driveshafts, each of the hinge attachments comprising a hinge yoke for each of the at least two rotor blades, the hinge yokes rotatably attached to the inner tips of the at least two rotor blades whereby each of the at least two rotor blades can rotate about a hinge axis substantially orthogonal to the driveshaft axis; and each of the hinge attachments configured such that the driveshaft axis is disposed between each of the at least two rotor blades and the hinge axis thereof.

Broadly stated, in some embodiments, a negative hinge offset rotor head assembly for a helicopter can be provided, the assembly comprising: a rotor hinge block, configured for operatively coupling to a helicopter driveshaft, the driveshaft configured for rotating about a driveshaft axis; at least two hinge yokes rotatably attached to the rotor hinge block, each of the at least two hinge yokes configured to rotate about a hinge axis substantially orthogonal to the draftshaft axis, each of the at least two yokes operatively coupled to an inner tip of a rotor blade; and each of the at least two hinge yokes comprising a pair of yoke arms, the pair of yoke arms rotatably attached to the rotor hinge block with a hinge pin coaxially aligned with the hinge axis, wherein the driveshaft axis is disposed between the hinge axis and the inner tip of the rotor blade.

Broadly stated, in some embodiments, the driveshaft axis can be disposed between the hinge axes of the at least two hinge yokes.

Broadly stated, in some embodiments, the at least two hinge yokes can comprise a first hinge yoke and a second hinge yoke, the first hinge yoke rotatably attached to the rotor hinge block with a first hinge pin and the second hinge yoke rotatably to the rotor hinge block with a second hinge pin.

Broadly stated, in some embodiments, the pair of yoke arms of the first hinge yoke can comprise first slotted holes for the second hinge pin to pass through, and wherein the pair of yoke arms of the second hinge yoke comprises second slotted holes for the first hinge pin to pass through.

Broadly stated, in some embodiments, each of the at least two hinge yokes can be rotatably coupled to its respective rotor blade, the rotor blade configured to rotate about a rotor blade axis.

Broadly stated, in some embodiments, the rotor blade axis can be substantially orthogonal to the hinge axis.

Broadly stated, in some embodiments, the rotor hinge block can comprise a pair of substantially parallel outer sidewalls and a pair of interior walls, the interior walls substantially parallel to the outer sidewalls thereby forming a yoke arm opening disposed between each outer sidewalls and its adjacent interior sidewall, each yoke arm opening configured to receive one of the pair of yoke arms of each the at least two hinge yokes.

Broadly stated, in some embodiments, the at least two hinge yokes can comprise a first hinge yoke and a second hinge yoke, and wherein one of the pair of yoke arms of the first hinge yoke can be disposed in a first yoke arm opening and rotatably attached to the rotor hinge block with one of a first hinge pin, and wherein one of the pair of yoke arms of the second hinge yoke can be disposed in the first yoke arm opening and rotatably to the rotor hinge block with one of a second hinge pin.

Broadly stated, in some embodiments, the one of the pair of yoke arms of the first yoke hinge can comprise a first slotted hole for the second hinge pin to pass through, and wherein the one of the pair of yoke arms of the second hinge yoke can comprise a second slotted hole for the first hinge pin to pass through.

Broadly stated, in some embodiments, another of the pair of yoke arms of the first hinge yoke can be disposed in a second yoke arm opening and rotatably attached to the rotor hinge block with another of the first hinge pin, and wherein another of the pair of yoke arms of the second hinge yoke can be disposed in the second yoke arm opening and rotatably to the rotor hinge block with another of the second hinge pin.

Broadly stated, in some embodiments, the another of the pair of yoke arms of the first yoke hinge can comprise another of the first slotted hole for the another of the second hinge pin to pass through, and wherein the another of the pair of yoke arms of the second hinge yoke can comprise another of the second slotted hole for the another of the first hinge pin to pass through.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

Figure 2:
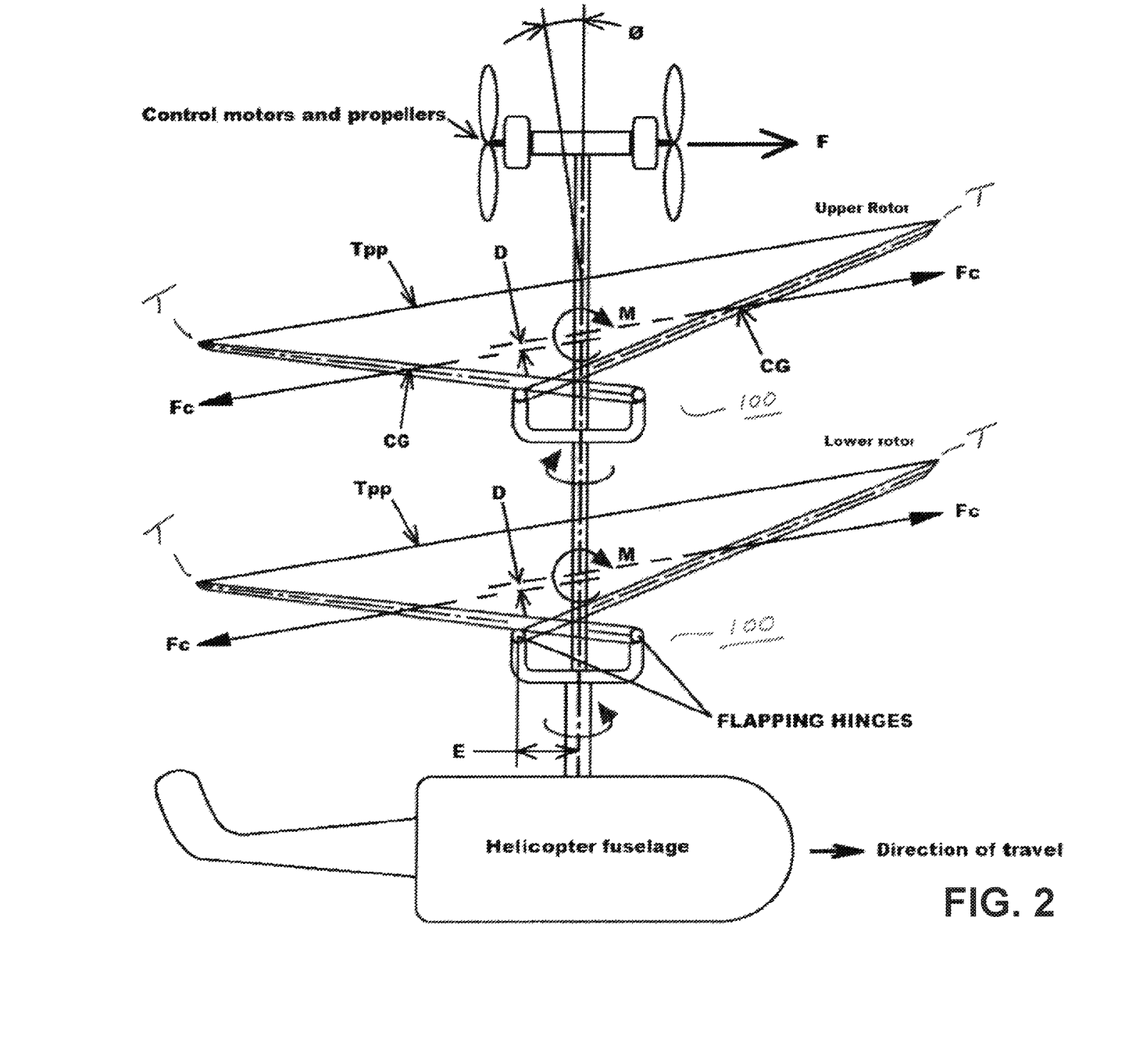
FIG. 2 is a side elevation view depicting a flapping negative offset rotor hinge arrangement for a coaxial helicopter.

Referring to FIG. 2, one embodiment of an alternative flapping rotor hinge placement for helicopters is shown. In some embodiments, this alternative flapping hinge can be used on helicopters that do not use cyclic pitch control but, rather, use a different method of pitch and roll control. In some embodiments, pitch and roll control can be accomplished using control motors and propellers as illustrated in the example shown in FIG. 2. In some embodiments, a cluster of control motors can be mounted above the main rotors, and the speed of these control motors can be varied to thrust laterally and longitudinally that can, therefore, provide pitch and roll control of the helicopter.

In the example shown in FIG. 2, only the pitch control motors and propellers are shown for clarity, and the helicopter is shown moving in the forward direction as indicated. In this example, the pitch control motors can be modulated to provide a thrust force F in the forward direction as shown. This thrust force F can create both a nose-down pitching moment and a thrust force in the forward direction, both of which contribute to the forward motion of the helicopter.

In example shown in FIG. 2, those skilled in the art will know that the rotor disks of a helicopter with flapping hinges moving forward through the air with no cyclic pitch input will result in the rotor disks tilting rearward, with the rearward tilt proportional with forward speed as shown. This is caused by the effect of the rearward airflow over the rotor disks, which is an effect well known to those skilled in the art. This rearward tilt of the rotor disks results in a rearward (nose-up) pitching moment as the thrust vectors from the rotor disks are offset forward of the center of the gravity of the aircraft.

Figure 3:
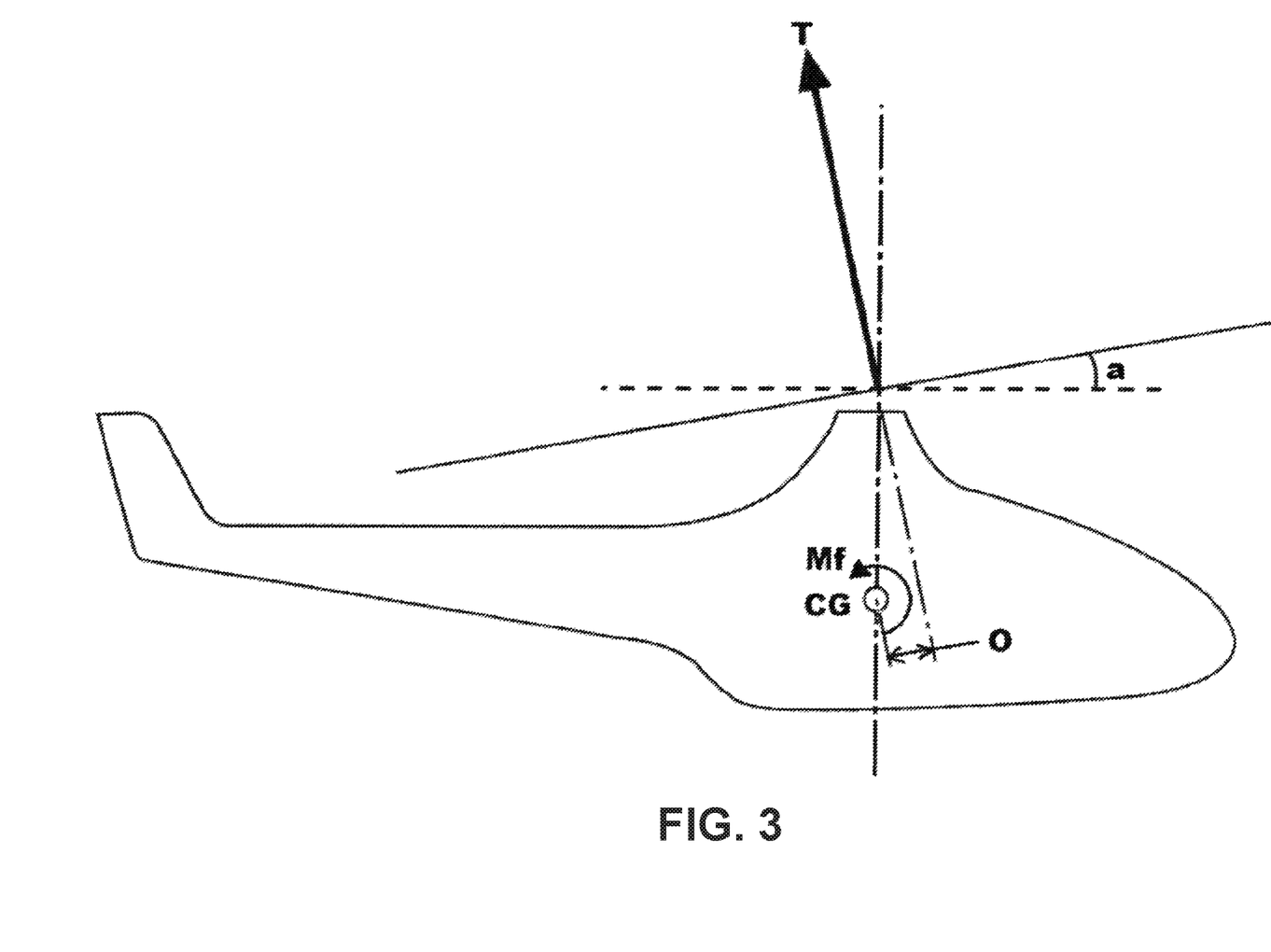
FIG. 3 is a side elevation view depicting the effect of rearward pitching moment on a helicopter when the rotors have a rearward tilt.

An example of this effect as it pertains to a single rotor helicopter is shown in FIG. 3. In this case, the rearward tilt of the rotor disk (angle a) results in the main rotor thrust vector F being offset from the Center of Gravity (CG) by distance O. This results in a rearward (nose-up) pitching moment Mf. This nose-up pitching moment increases with forward speed, and because it acts in the opposite direction to the nose-down pitching moment created by the control motors and propellers, the nose-up pitching moment can counter the nose-down pitching moment.

When nose-up pitching moment is equal and opposite to the nose-down pitching moment, the two pitching moments can cancel each other out thereby limiting the top speed of the aircraft to the forward thrust provided by the control motors and propellers. This limitation of top speed is undesirable.

In some embodiments, the flapping hinge centerlines of the rotors can be offset to the opposing side of the rotor disk rotational axis, as shown in FIG. 2, by a distance of E. This can help offset the undesirable nose-up pitching moment described above. The rotor blades, rotor blades and flapping hinges can be arranged in such a way to not interfere with each other to provide a smooth flapping motion despite appearing to interfere with other in the example shown. In this case, the rearward tilt of the TPP (which can be approximately the same as the rearward disk tilt angle θ) coupled with the hinge offset distance E means that the CG of the rear rotor blade can be further away from the TPP than the CG of the front rotor blade as shown. Due to this, the centripetal force vectors from the front and rear rotor blades do not intersect, but can be offset from each other by a distance denoted by D, thereby resulting in a nose-down pitching moment from each rotor disk denoted by M. For helicopters having two rotor blades fitted per rotor, this pitching moment is not constant, rather, it can vary sinusoidally with rotation of the rotor disk. The pitching moment can be at a maximum when the rotor blades are positioned as shown in the example and can be at a minimum when the rotor blades are rotated 90 degrees from that shown. For helicopters having 3 or more rotor blades per rotor, the pitching moment can be constant.

With careful control of flapping hinge offset E, the undesirable nose-up pitching moment from the offset thrust vector from rearward disk tilt described previously can be largely cancelled out with the nose-down pitching moment created by the offset flapping hinge placement as described herein. This can result in a much higher top speed as greater forward thrust can be provided by both the control motors and propellers and the rotors of the helicopter than the conventional flapping hinge offset arrangement as shown in FIG. 1.

As shown in FIGS. 2 and 4 to 8, in some embodiments, negative hinge offset rotor head assembly 100 can comprise the positioning of the flapping hinge axis on the opposite side of the helicopter driveshaft axis with respect to the rotor blade tip.

Figure 4:
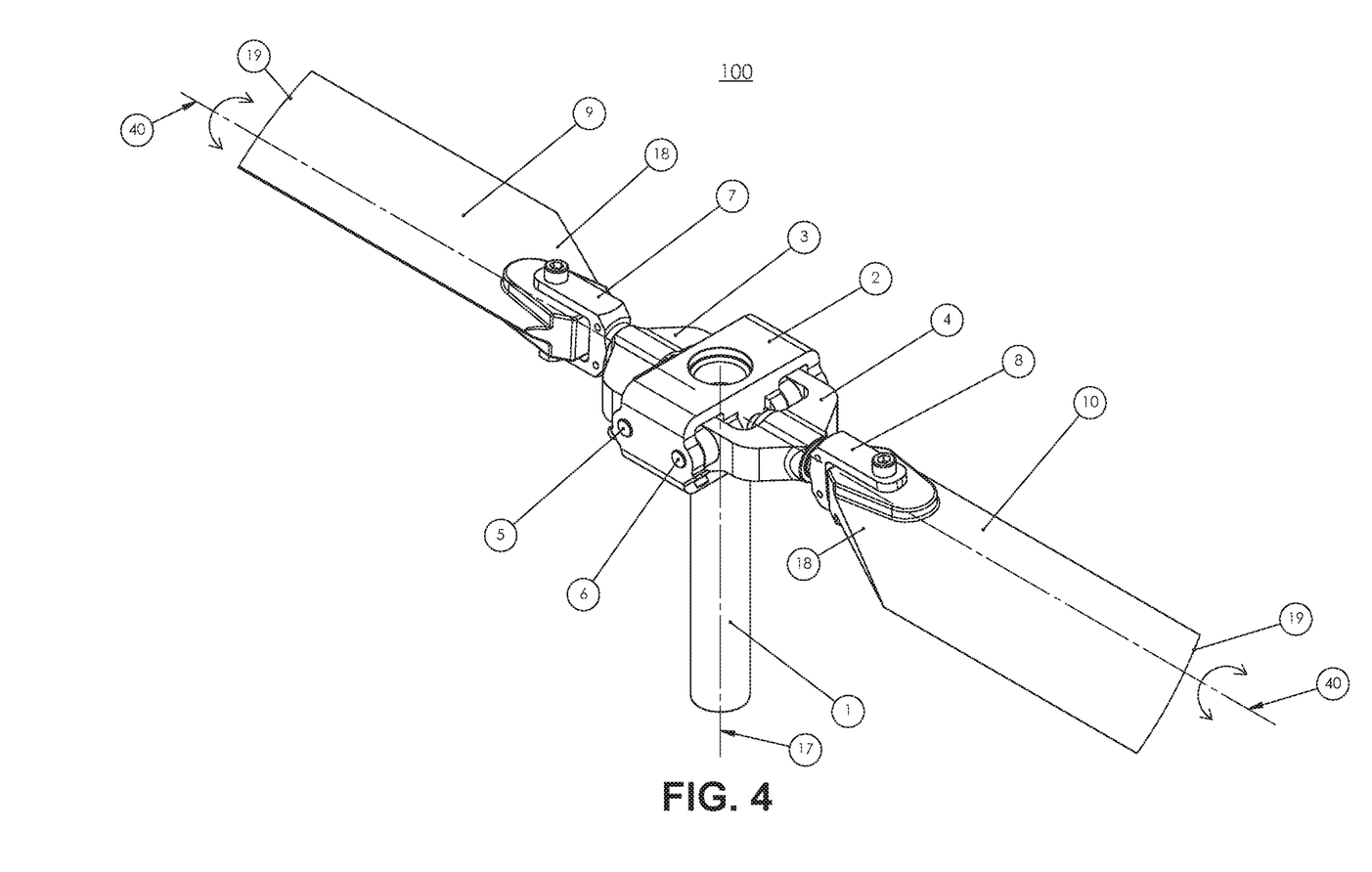
FIG. 4 is a perspective view depicting one embodiment of a negative hinge offset rotor head for a helicopter.

Referring to FIG. 4, in some embodiments, negative hinge offset rotor head assembly 100 can comprise of driveshaft 1, rotor hinge block 2, rotor hubs or hinge yokes 3 and 4, flapping hinge pins 5 and 6, blade receivers 7 and 8, and rotor blades 9 and 10, wherein inner tip 18 of blades 9 and 10 are operatively coupled to blade receivers 7 and 8, respectively, and wherein the outer end of each of rotor blades 9 and 10 can be referred to as outer tip 19. In some embodiments, each of blade receivers 7 and 8 can be rotatably coupled to hinge yokes 3 and 4, respectively, wherein each of rotor blades 9 and 10 can rotate about longitudinal rotor blade axis 40, wherein rotor blade axis 40 is substantially orthogonal to one or both of flapping hinge axes 20 and 22.

For the purposes of clarity, each of rotor blades 9 and 10 have been shortened in length in FIGS. 4 to 8, with it being understood that rotor blades 9 and 10 can be longer in length than as shown in the figures, and that outer tips 19 corresponds to reference character T as shown in FIGS. 1 to 3. In some embodiments, rotor head assembly 100 can be configured such that when driveshaft 1 rotates, the entire assembly can rotate about longitudinal driveshaft axis 17, which can allow blades 9 and 10 to generate lift.

Figure 5:
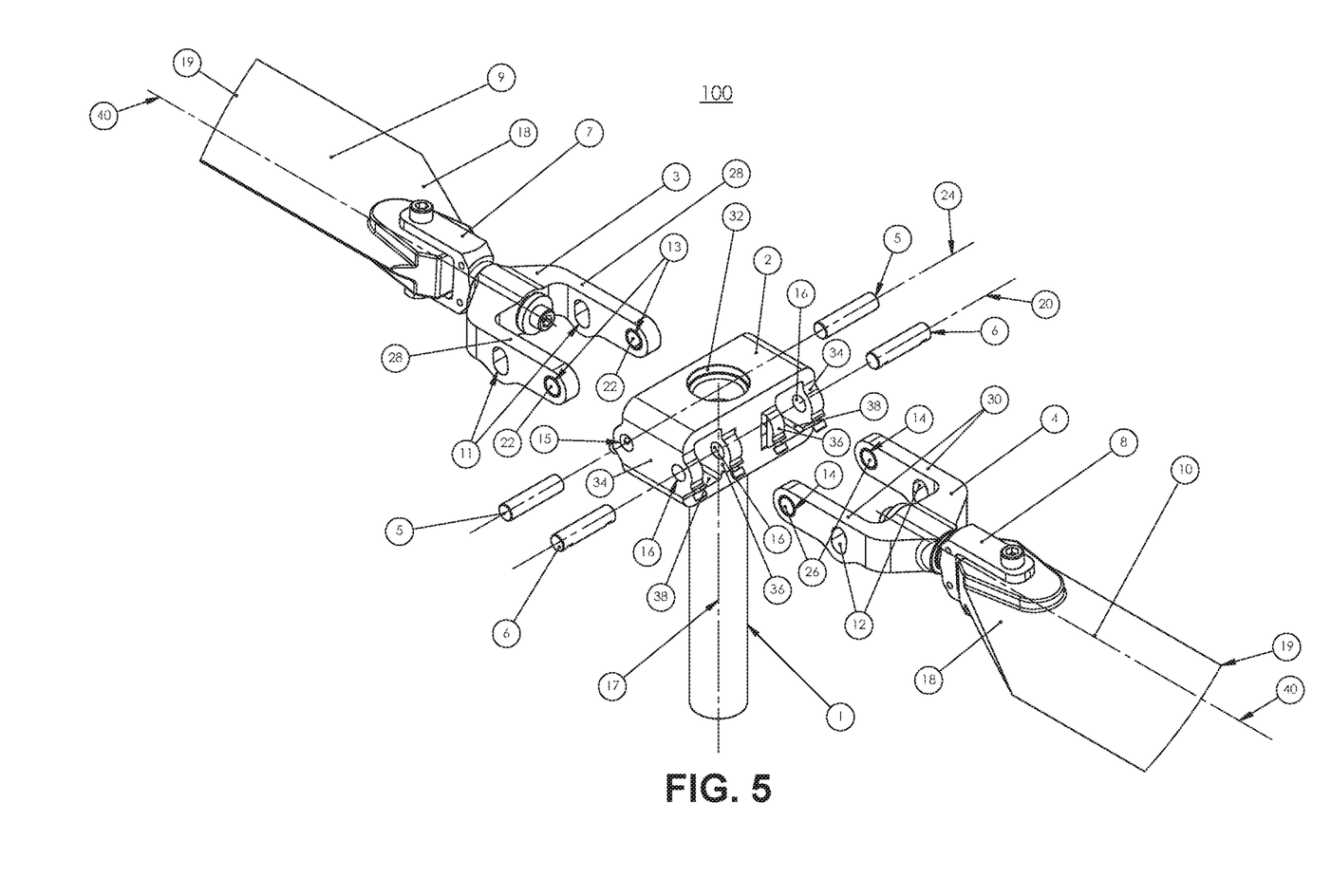
FIG. 5 is an exploded perspective view depicting the negative hinge offset rotor head of FIG. 4.
Figure 6:
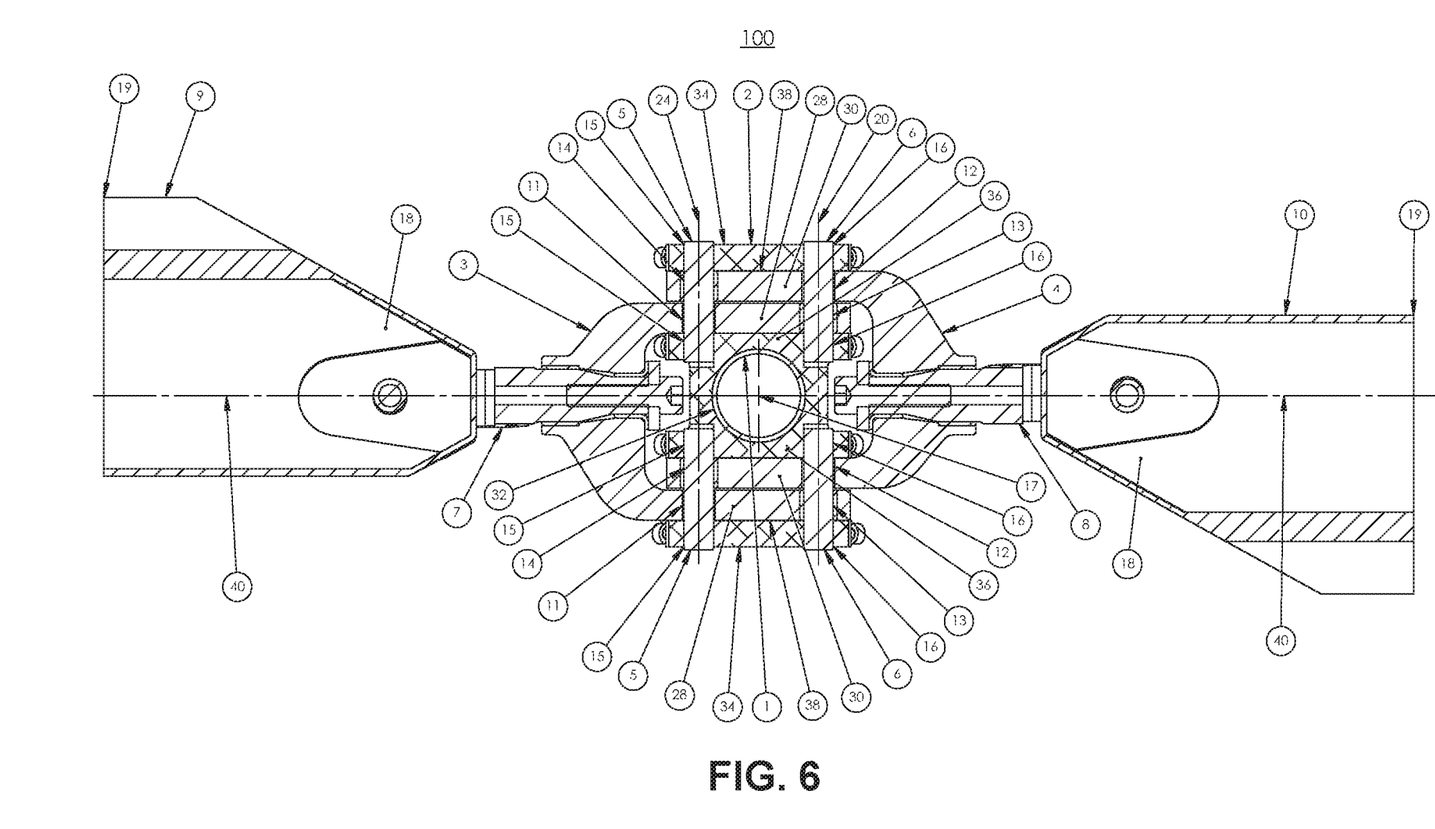
FIG. 6 is a cutaway top plan view depicting the negative hinge offset rotor head of FIG. 4.

Referring to FIG. 5, a view of rotor head assembly 100 partially disassembled is shown, and a sectioned view of the assembled rotor head assembly 100 can be seen in FIG. 6. In some embodiments, hinge yoke 3 can comprise a pair of yoke arms 28, wherein holes 11 and 13 can disposed through each of yoke arms 28 such that the pair of holes 11 are coaxially aligned and that the pair of holes 13 are coaxially aligned. Similarly, in some embodiments, hinge yoke 4 can comprise a pair of yoke arms 30, wherein holes 12 and 14 can disposed through each of yoke arms 30 such that the pair of holes 12 are coaxially aligned and that the pair of holes 14 are coaxially aligned.

In some embodiments, driveshaft 1 can be operatively coupled to rotor hinge block 2 in opening 32 disposed therethrough. In some embodiments, rotor hinge block 2 can comprise a pair of substantially parallel and vertical outer sidewalls 34 and a pair of substantially parallel and vertical interior walls 36, wherein interior walls 36 are substantially parallel to outer sidewalls 34 wherein a yoke arm opening 38 is formed between each outer sidewall 34 and the interior wall 36 adjacent thereto. In some embodiments, rotor hinge block 2 can comprise holes 15 and 16 disposed substantially horizontally therethrough, wherein holes 15 and 16 can pass through an outer sidewall 34 into the adjacent interior wall 36.

In some embodiments, yoke arms 28 of hinge yoke 3 and yoke arms 30 of hinge yoke 4 can be inserted into yoke arm openings 38 from opposing sides of rotor hinge block 2 in an overlapping fashion, as shown in FIG. 6. In some embodiments, from one side of rotor hinge block 2, flapping hinge pins 5 can pass through holes 15 disposed through outer sidewalls 34 of rotor hinge block 2, through slotted holes 11 disposed through yoke arms 28, then through holes 14 disposed through yoke arms 30 and then into holes 15 disposed in interior walls 36. Similarly, flapping hinge pins 6 can pass through holes 16 disposed through outer sidewalls 34 of rotor hinge block 2, through slotted holes 12 disposed through yoke arms 30, then through holes 13 disposed through yoke arms 28 and then into holes 16 disposed in interior walls 36. From the other side of rotor hinge block 2, the order of which yoke arms flapping hinge pins 5 and 6 pass through is reversed.

In some embodiments, blade 9, blade receiver 7 and hinge yoke 3 can pivot freely up and down about flapping hinge axis 20 of coaxially aligned flapping hinge pins 6 disposed in holes 13. In some embodiments, flapping hinge axis 20 can be substantially orthogonal to In some embodiments, holes 13 can be fitted with bushings 22 that can allow smooth rotation on the outer diameter of flapping hinge pins 6. Slotted holes 11 can provide clearance so that during the normal range of flapping, hinge yoke 3 does not interfere with flapping hinge pins 5.

Similarly, in some embodiments, blade 10, blade receiver 8 and hinge yoke 4 can pivot freely up and down about flapping hinge axis 24 of coaxially aligned flapping hinge pins 5 disposed in holes 14. In some embodiments, holes can be fitted with bushings 26 that can allow smooth rotation on the outer diameter of flapping hinge pins 5. Slotted holes 12 can provide clearance so that during the normal range of flapping, hinge yoke 4 does not interfere with flapping hinge pins 6.

Figure 7:
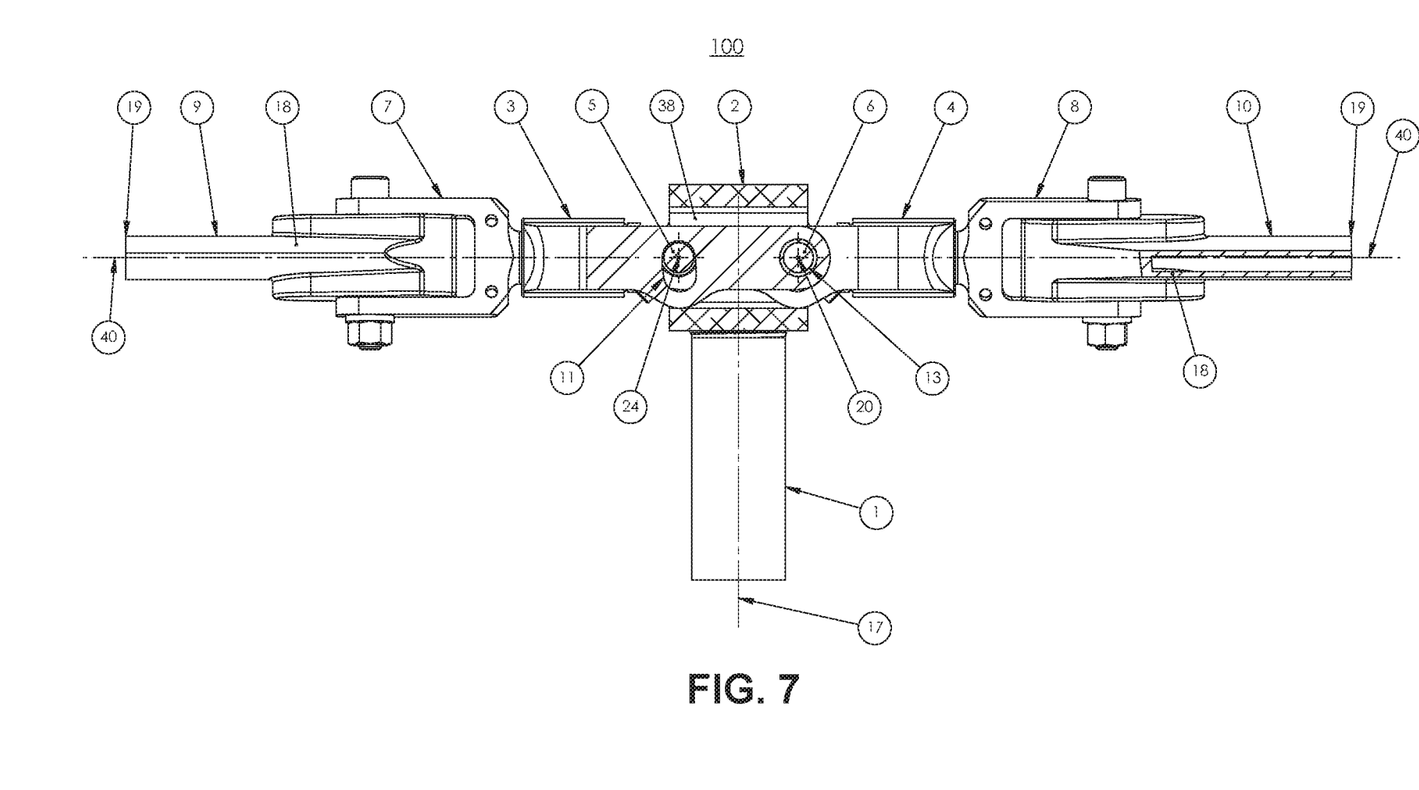
FIG. 7 is a cutaway front elevation view depicting the negative hinge offset rotor head of FIG. 4 when the rotor blades are horizontal.
Figure 8:
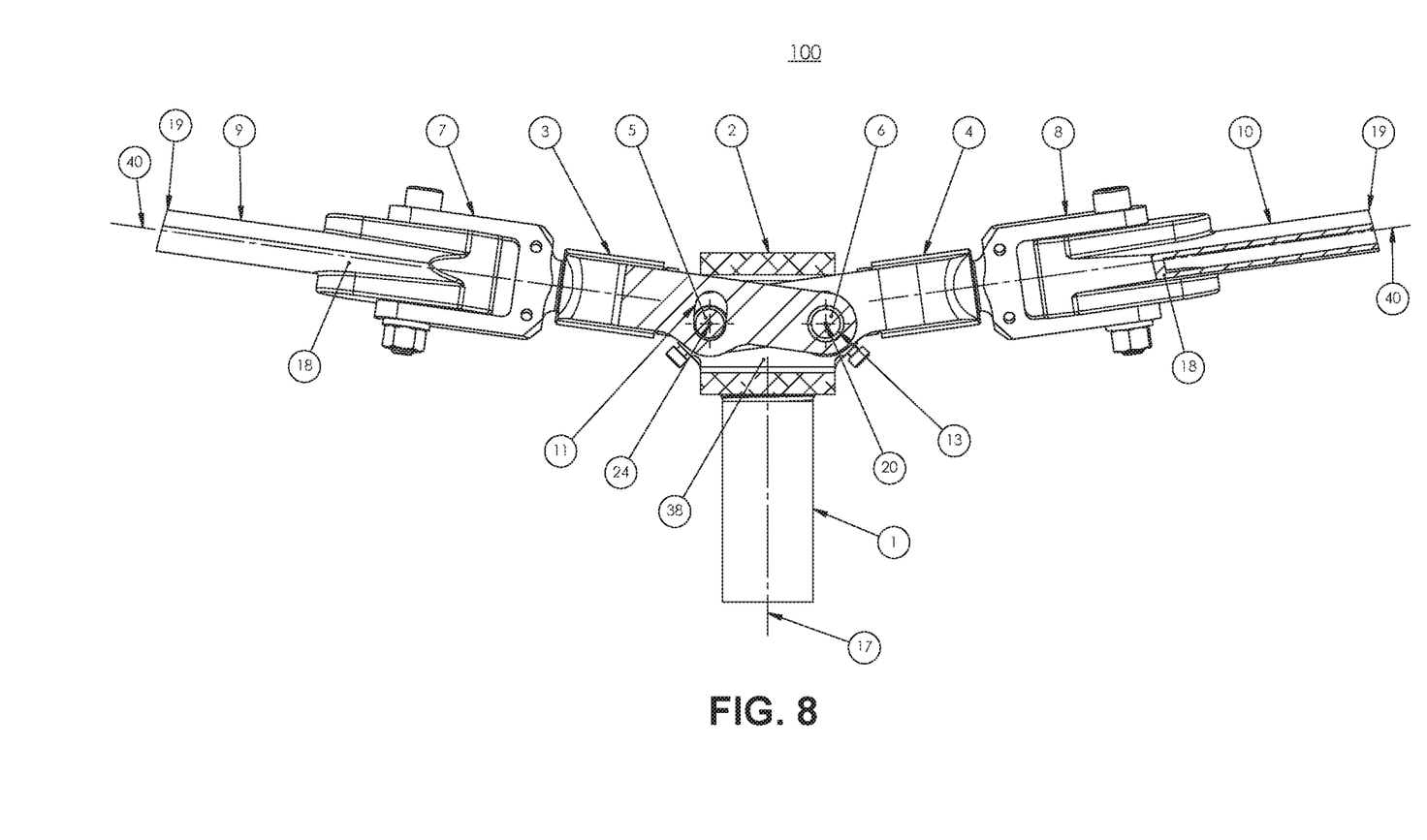
FIG. 8 is a cutaway front elevation view depicting the negative hinge offset rotor head of FIG. 4 when the rotor blades are tilted.

Referring to FIG. 7, blades 9 and 10 are shown in a lowered flapping (resting) position whereas in FIG. 8, blades 9 and 10 are shown in a raised flapping position. As shown, driveshaft axis 17 is, thus, disposed between blade 9 and flapping hinge axis 20. Similarly, driveshaft axis 17 is disposed between blade 10 and flapping hinge axis 24.

In some embodiments, the rotor blades can be operated and controlled by the servo control systems and the flight controller as described in the Applicant's international patent application no. PCT/CA2017/051458, which is incorporated by reference into this application in its entirety.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. A negative hinge offset rotor head assembly for a helicopter, the assembly comprising:
    a) a rotor hinge block, configured for operatively coupling to a helicopter driveshaft, the driveshaft configured for rotating about a driveshaft axis;
    b) at least two hinge yokes rotatably attached to the rotor hinge block, each of the at least two hinge yokes configured to rotate about a hinge axis substantially orthogonal to the draftshaft axis, wherein the driveshaft axis is disposed between the hinge axes of the at least two hinge yokes, and wherein each of the at least two hinge yokes is operatively coupled to an inner tip of a rotor blade, wherein the at least two hinge yokes comprises a first hinge yoke and a second hinge yoke, the first hinge yoke rotatably attached to the rotor hinge block with a first hinge pin and the second hinge yoke rotatably attached to the rotor hinge block with a second hinge pin; and
    c) each of the first hinge yoke and the second hinge yoke comprising a pair of yoke arms, wherein the driveshaft axis is disposed between the hinge axis and the inner tip of the rotor blade, and wherein the pair of yoke arms of the first hinge yoke comprises first slotted holes for the second hinge pin to pass through, and wherein the pair of yoke arms of the second hinge yoke comprises second slotted holes for the first hinge pin to pass through.

2. The assembly as set forth in claim 1, wherein each of the at least two hinge yokes is rotatably coupled to its respective rotor blade, the rotor blade configured to rotate about a rotor blade axis.

3. The assembly as set forth in claim 2, wherein the rotor blade axis is substantially orthogonal to the hinge axis.

4. The assembly as set forth in claim 1, wherein the rotor hinge block comprises a pair of substantially parallel outer sidewalls and a pair of interior walls, the interior walls substantially parallel to the outer sidewalls thereby forming a yoke arm opening disposed between each outer sidewalls and its adjacent interior sidewall, each yoke arm opening configured to receive one of the pair of yoke arms of each the at least two hinge yokes.

5. The assembly as set forth in claim 4, wherein a first of the pair of yoke arms of the first hinge yoke is disposed in a first yoke arm opening and rotatably attached to the rotor hinge block with the first hinge pin, and wherein a first of the pair of yoke arms of the second hinge yoke is disposed in the first yoke arm opening and rotatably attached to the rotor hinge block with the second hinge pin.

6. The assembly as set forth in claim 5, wherein the first of the pair of yoke arms of the first hinge yoke comprises one of the first slotted holes for the second hinge pin to pass through, and wherein the first of the pair of yoke arms of the second hinge yoke comprises one of the second slotted holes for the first hinge pin to pass through.

7. The assembly as set forth in claim 5, wherein a second of the pair of yoke arms of the first hinge yoke is disposed in a second yoke arm opening and rotatably attached to the rotor hinge block with the first hinge pin, and wherein a second of the pair of yoke arms of the second hinge yoke is disposed in the second yoke arm opening and rotatably to the rotor hinge block with the second hinge pin.

8. The assembly as set forth in claim 7, wherein the second of the pair of yoke arms of the first hinge yoke comprises another of the first slotted holes for the second hinge pin to pass through, and wherein the second of the pair of yoke arms of the second hinge yoke comprises another of the second slotted holes for the first hinge pin to pass through.

9. A helicopter comprising a negative hinge offset rotor head assembly, the negative hinge offset rotor head assembly comprising:
    a) a rotor hinge block, configured for operatively coupling to a helicopter driveshaft, the driveshaft configured for rotating about a driveshaft axis;
    b) at least two hinge yokes rotatably attached to the rotor hinge block, each of the at least two hinge yokes configured to rotate about a hinge axis substantially orthogonal to the driveshaft axis, wherein the driveshaft axis is disposed between the hinge axes of the at least two hinge yokes, and wherein each of the at least two hinge yokes is operatively coupled to an inner tip of a rotor blade, wherein the at least two hinge yokes comprises a first hinge yoke and a second hinge yoke, the first hinge yoke rotatably attached to the rotor hinge block with a first hinge pin and the second hinge yoke rotatably attached to the rotor hinge block with a second hinge pin; and c) each of the first hinge yoke and the second hinge yoke comprising a pair of yoke arms, wherein the driveshaft axis is disposed between the hinge axis and the inner tip of the rotor blade, and wherein the pair of yoke arms of the first hinge yoke comprises first slotted holes for the second hinge pin to pass through, and wherein the pair of yoke arms of the second hinge yoke comprises second slotted holes for the first hinge pin to pass through.

10. The helicopter as set forth in claim 9, wherein each of the at least two hinge yokes is rotatably coupled to its respective rotor blade, the rotor blade configured to rotate about a rotor blade axis.

11. The helicopter as set forth in claim 10, wherein the rotor blade axis is substantially orthogonal to the hinge axis.

12. The helicopter as set forth in claim 9, wherein the rotor hinge block comprises a pair of substantially parallel outer sidewalls and a pair of interior walls, the interior walls substantially parallel to the outer sidewalls thereby forming a yoke arm opening disposed between each outer sidewalls and its adjacent interior sidewall, each yoke arm opening configured to receive one of the pair of yoke arms of each the at least two hinge yokes.

13. The helicopter as set forth in claim 12, wherein a first of the pair of yoke arms of the first hinge yoke is disposed in a first yoke arm opening and rotatably attached to the rotor hinge block with the first hinge pin, and wherein a first of the pair of yoke arms of the second hinge yoke is disposed in the first yoke arm opening and rotatably attached to the rotor hinge block with the second hinge pin.

14. The helicopter as set forth in claim 13, wherein the first of the pair of yoke arms of the first hinge yoke comprises one of the first slotted holes for the second hinge pin to pass through, and wherein the first of the pair of yoke arms of the second hinge yoke comprises one of the second slotted holes for the first hinge pin to pass through.

15. The helicopter as set forth in claim 13, wherein a second of the pair of yoke arms of the first hinge yoke is disposed in a second yoke arm opening and rotatably attached to the rotor hinge block with the first hinge pin, and wherein a second of the pair of yoke arms of the second hinge yoke is disposed in the second yoke arm opening and rotatably to the rotor hinge block with the second hinge pin.

16. The helicopter as set forth in claim 15, wherein the second of the pair of yoke arms of the first hinge yoke comprises another of the first slotted holes for the second hinge pin to pass through, and wherein the second of the pair of yoke arms of the second hinge yoke comprises another of the second slotted holes for the first hinge pin to pass through.

* * * * *